US012795607B2

(12) United States Patent
Li

(10) Patent No.: US 12,795,607 B2
(45) Date of Patent: Nov. 10, 2026

(54) PAGING PARAMETER DETERMINATION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 199 days.

(21) Appl. No.: 18/639,295

(22) Filed: Apr. 18, 2024

(65) Prior Publication Data

US 2024/0267888 A1 Aug. 8, 2024

Related U.S. Application Data

(63) Continuation of application No. PCT/CN2021/124784, filed on Oct. 19, 2021.

(51) Int. Cl.
*H04W 68/02* (2009.01)
*H04W 24/08* (2009.01)
*H04W 76/28* (2018.01)

(52) U.S. Cl.
CPC ........... *H04W 68/02* (2013.01); *H04W 24/08* (2013.01); *H04W 76/28* (2018.02)

(58) Field of Classification Search
None
See application file for complete search history.

(56) References Cited

U.S. PATENT DOCUMENTS

2023/0199902 A1* 6/2023 Vogedes ............ H04W 52/0251 455/458
2024/0179792 A1* 5/2024 Höglund ............... H04W 76/28
2024/0334461 A1* 10/2024 Lyazidi ............. H04W 52/0216

FOREIGN PATENT DOCUMENTS

CN 107667547 A 2/2018
CN 112788618 A 5/2021
WO 2021088503 A1 5/2021

OTHER PUBLICATIONS

Notice of Reasons for Refusal for Japanese Patent Application No. 2024-523429, dated Feb. 5, 2025, 9 pages.
Ericsson; "Details of eDRX and PTW in RRC_IDLE and RRC_INACTIVE", 3GPP TSG-RAN WG2 #115-e, Tdoc R1-2108280, Electronic meeting, Aug. 9-27, 2021, 9 pages.
MediaTek Inc.; "Remaining issues for eDRX", 3GPP TSG-RAN WG2 Meeting #115-e, R2-2108230, Online, Aug. 9-27, 2021, 10 pages.
Ericsson; "Summary of [AT114-e][110][REDCAP] eDRX aspects (Ericsson)", 3GPP TSG-RAN WG2 Meeting #114-e, R2-2106530, Electronic meeting, May 19-27, 2021, 19 pages.
Extended European Search Report Issued in Application No. 21960883.3 dated Nov. 6, 2024, 12 pages.

(Continued)

*Primary Examiner* — Adolf Dsouza
(74) *Attorney, Agent, or Firm* — Finnegan, Henderson, Farabow, Garrett & Dunner, L.L.P.

(57) ABSTRACT

A method for determining a paging parameter is performed by a user equipment (UE), and includes: determining, based on an inactive state extended discontinuous reception (eDRX) cycle, a cycle for the UE to monitor at least one of a radio access network (RAN) paging message or a core network (CN) paging message.

22 Claims, 6 Drawing Sheets

(56) References Cited

OTHER PUBLICATIONS

"EDRX for RedCap UEs", ZTE Corporation, Sanechips, 3GPP TSG-RAN WG2 Meeting #115e, R2-2107751, Online, Aug. 2021, 8 pages.
"Discussion on e-DRX for Redcap Devices", Xiaomi Communications, 3GPP TSG-RAN WG2 Meeting #115, R2-2107534, Online, Aug. 16-Aug. 27, 2021, 4 pages.
"Consideration on providing eDRX information in XnAP RAN Paging", Huawei, 3GPP TSG-RAN WG3 Meeting #112-e, R3-211539, E-meeting, May 17-28, 2021, 4 pages.
"Paging narrowband/carrier selection after RRC connection release", Qualcomm Incorporated, 3GPP TSG RAN WG2 #113-e, Tdoc R2-2101152, Online, Jan. 25-Feb. 5, 2021, 3 pages.
International Search Report and Written Opinion of International Application No. PCT/CN2021/124784, dated Jul. 19, 2022, 14 pages.
Office Action for IN Application No. 202447038938, dated Jul. 2, 2026.

* cited by examiner

PAGING PARAMETER DETERMINATION METHOD AND APPARATUS, COMMUNICATION DEVICE, AND STORAGE MEDIUM

CROSS-REFERENCE TO RELATED APPLICATION

This application is a continuation application of International Application No. PCT/CN2021/124784, filed on Oct. 19, 2021, the entire contents of which are incorporated herein by reference for all purposes.

TECHNICAL FIELD

The present disclosure relates to, but is not limited to, a field of wireless communication technologies, in particular to a method and an apparatus for determining a paging parameter, a communication device and a storage medium.

BACKGROUND

The 5th generation (5G) cellular mobile communication network further reduces energy consumption of a terminal by using an extended discontinuous reception (eDRX) mechanism. In each eDRX cycle, the terminal may receive downlink data only within a set paging time window (PTW), and the terminal is in a dormant state and does not receive downlink data in remaining time. The eDRX mechanism may obtain a trade-off between downlink service delay and power consumption. For example, the eDRX mechanism may be used for remote gas switch control and the like.

SUMMARY

Accordingly, the present disclosure provides a method and an apparatus for determining a paging parameter, a communication device and a storage medium.

According to a first aspect of embodiments of the present disclosure, a method for determining a paging parameter is performed by a user equipment (UE), and includes:

- determining, based on an inactive state extended discontinuous reception (eDRX) cycle, a cycle for the UE to monitor at least one of a radio access network (RAN) paging message or a core network (CN) paging message.

According to a second aspect of the embodiments of the present disclosure, a communication method is performed by a first base station, and includes:

- transmitting inactive state extended discontinuous reception (eDRX) information, in which the inactive state eDRX information is at least configured to indicate an inactive state eDRX cycle, and the inactive state eDRX cycle is configured to determine a cycle for a user equipment (UE) to monitor at least one of a radio access network (RAN) paging message or a core network (CN) paging message.

According to a third aspect of the present disclosure, a user equipment (UE) includes: a processor, and a memory storing a program. The processor is configured to determine, based on an inactive state extended discontinuous reception (eDRX) cycle, a cycle for the UE to monitor at least one of a radio access network (RAN) paging message or a core network (CN) paging message.

According to a fourth aspect of the present disclosure, a first base station includes: a processor, and a memory storing a program. The processor is configured to perform the method described in the second aspect of the present disclosure.

It should be understood that the above general descriptions and following detailed descriptions are exemplary and explanatory only, and are not intended to limit the present disclosure.

BRIEF DESCRIPTION OF THE DRAWINGS

The drawings herein are incorporated into the specification and constitute a part of the specification, show embodiments in conformity with embodiments of the present disclosure, and explain the principle in embodiments of the present disclosure together with the specification.

DETAILED DESCRIPTION

The example embodiments will be described in detail here, and examples thereof are shown in the accompanying drawings. When the following descriptions are referred to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms described in the present disclosure are only for the purpose of describing specific embodiments and are not intended to limit the embodiments of the present disclosure. The singular forms “a”, “the” and “said” used in the embodiments of the present disclosure and the attached claim are also intended to include plural forms, unless the context clearly indicates otherwise. It should also be understood that the term “and/or” used in the present disclosure means and includes any or all possible combinations of one or more associated listed items.

It should be understood that, although the terms first, second, third, etc. may be used in the embodiments of the present disclosure to describe various information, such information shall not be limited to these terms. These terms are only used to distinguish the same type of information. For example, subject to the scope of this present disclosure, first information may also be referred to as second information, and similarly, and second information may also be referred to as first information. It depends on the context. For example, the word "if" as used herein may be interpreted as "in a case that" or "when" or "in response to determination".

Figure 1:
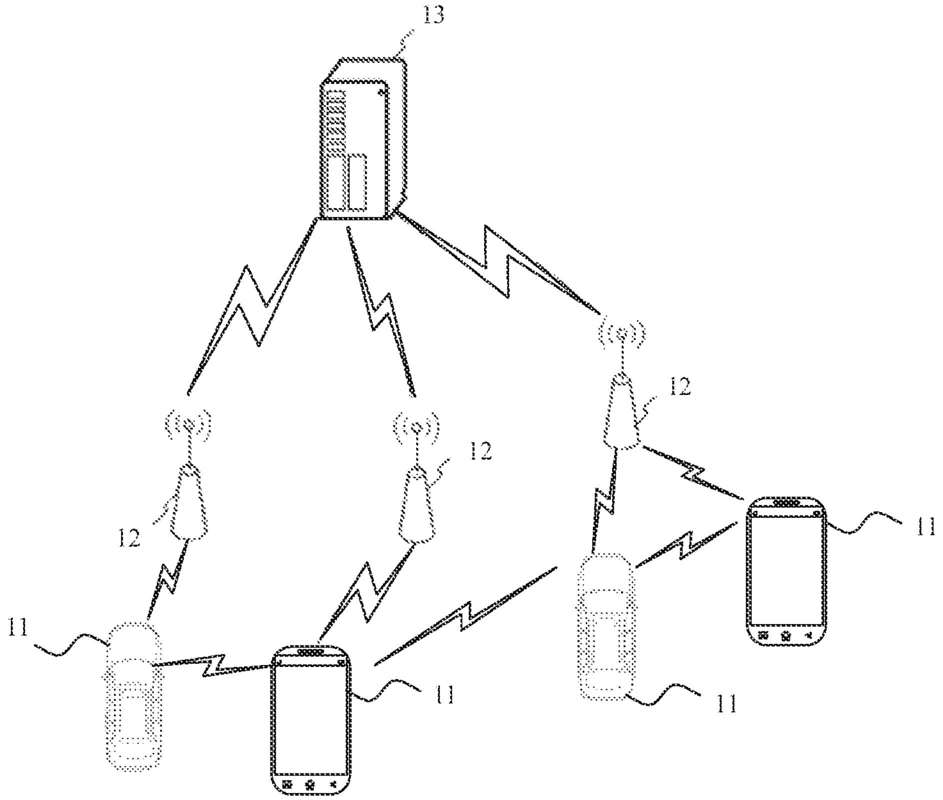
FIG. 1 is a schematic diagram of a wireless communication system according to an embodiment.

With reference to FIG. 1, FIG. 1 is a schematic diagram illustrating a wireless communication system provided in an embodiment of the present disclosure. As illustrated in FIG. 1, the wireless communication system is a communication system based on a cellular mobile communication technology. The wireless communication system may include several terminals 11 and several base stations 12.

The terminal 11 is a user equipment (UE) that provides voice and/or data connectivity for the user. The terminal 11 may communicate with one or more core networks through a radio access network (RAN). The terminal 11 may be an internet of things terminal, for example, a sensor device, a mobile phone (or referred to as a cellular phone) and a computer having an internet of things terminal, for example, may be a fixed, portable, compact, handheld, computer built-in or vehicle-mounted apparatus, for example, a station (STA), a subscriber unit, a subscriber station, a mobile station, a mobile, a remote station, an access point, a remote terminal, an access terminal, a user terminal, a user agent, a user device or a user equipment (UE). Or, the terminal 11 may be a device of an unmanned vehicle. Or, the terminal 11 may be a vehicle-mounted device, for example, may be a driving computer with a wireless communication function, or a wireless communication device externally connected to a driving computer. Or, the terminal 11 may be a roadside device, for example, may be a street lamp with the wireless communication function, a signal light or other roadside devices, etc.

A base station 12 may be a network side device in the wireless communication system. The wireless communication system may be a 4th generation mobile communication (4G) system, also referred to as a long term evolution (LTE) system; or the wireless communication system may be a 5G system, also referred to as a new radio (NR) system or a 5G NR system. Or, the wireless communication system may be a next generation system of the 5G system. An access network in a 5G system may be referred to as a new generation-radio access network (NG-RAN). Or, the wireless communication system may be a machine type communication (MTC) system.

The base station 12 may be an eNB adopted in 4G system. Or, the base station 12 may be a base station (gNB) with a centralized distributed architecture in the 5G system. When the base station 12 adopts the centralized distributed architecture, the base station 120 generally includes a central unit (CU) and at least two distributed units (DU). A protocol stack of a packet data convergence protocol (PDCP) layer, a radio link control (RLC) layer and a media access control (MAC) layer is configured in the CU; a physical (PHY) layer protocol stack is configured in the DU. The specific implementation of the base station 12 is not limited in the embodiments of the disclosure.

The base station 12 may establish a wireless connection with the terminal 11 through a wireless air interface. In different implementations, the wireless radio interface is a wireless radio interface based on a 4G standard; or, the wireless radio interface is a wireless radio interface based on a 5G standard. For example, the wireless radio interface is a new radio interface; or, the wireless radio interface may be a wireless radio interface based on a next generation mobile communication network technology standard of the 5G.

In some embodiments, an E2E (end to end) connection can also be established between the terminals 11, for example, scenarios of vehicle to vehicle (V2V) communication, vehicle to infrastructure (V2I) communication, vehicle to pedestrian (V2P) communication and the like in vehicle to everything (V2X).

In some embodiments, the wireless communication system may further include a network management device 13.

Several base stations 12 are connected with a network management device 13 respectively. The network management device 13 may be a core network device in the wireless communication system, for example, the network management device 13 may be a mobility management entity (MME) in an evolved packet core (EPC). Or, the network management device may be other core network devices, for example, a serving gateway (SGW), a public data network gateway (PGW), a policy and charging rules function (PCRF) or a home subscriber server (HSS), and the like. The implementation of the network management device 13 is not limited in the embodiment of the present disclosure.

The execution subject involved in the embodiments of the present disclosure includes, but is not limited to, a UE such as a mobile phone terminal supporting cellular mobile communication, a base station, and the like.

Figure 2:
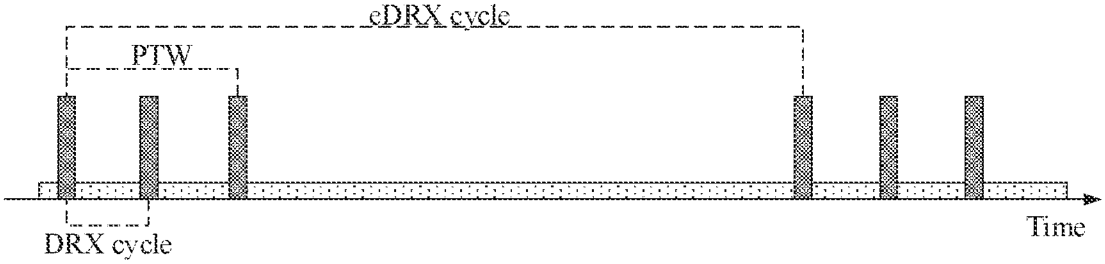
FIG. 2 is a schematic diagram of an eDRX cycle according to an embodiment.

An application scenario of the embodiments of the present disclosure is described as follows. As shown in FIG. 2, within each extended discontinuous reception (eDRX) cycle, there is one paging time window (PTW), and the terminal monitors a paging channel within the PTW according to a discontinuous reception (DRX) cycle, so as to receive downlink data, and the terminal is in a dormant state within remaining time. The eDRX cycle ranges from 20.48 seconds (s) to 2.92 hours (h). A value range of the DRX cycle includes {1.28 s, 2.56 s, 5.12 s, or 10.24 s}.

The eDRX mode may refer to that a terminal device is reachable at any time, but the delay is relatively large. The delay depends on the eDRX cycle configuration, and a trade-off may be obtained between low power consumption and the delay.

Figure 3:
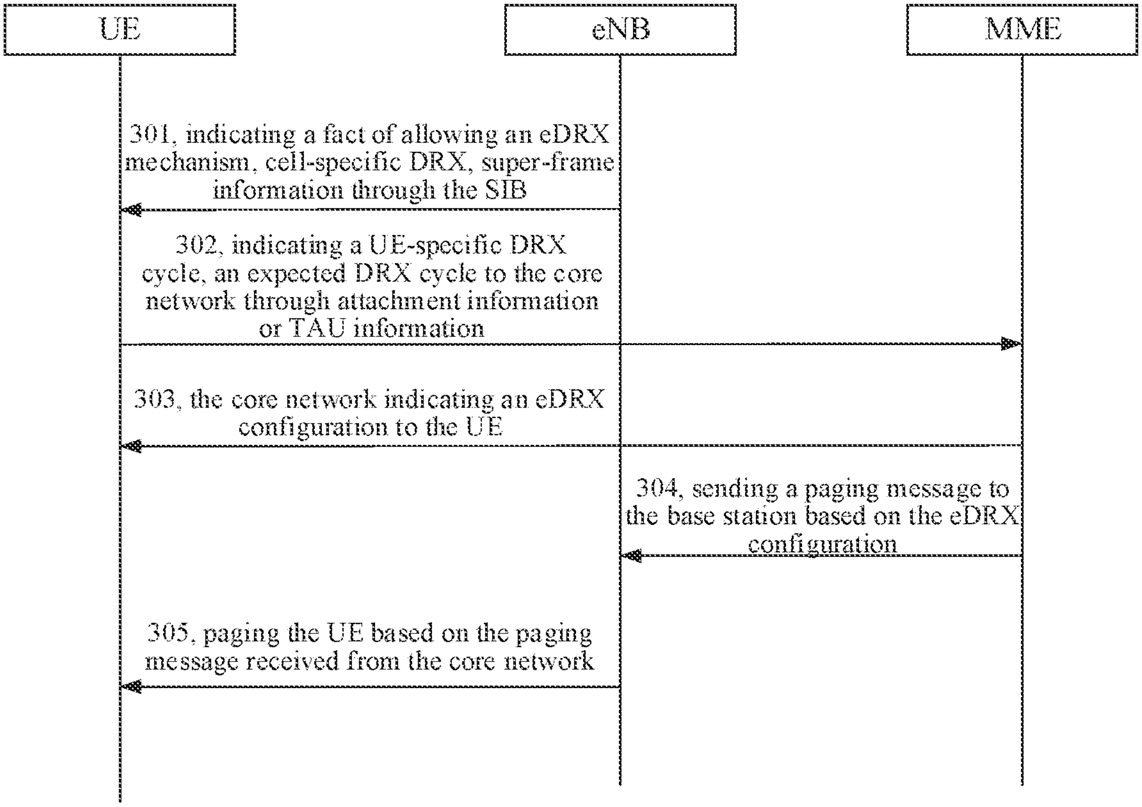
FIG. 3 is a schematic diagram of an interaction of configuring an eDRX cycle according to an embodiment.

In the eDRX mechanism, the UE and a core network may need to negotiate the eDRX cycle and a PTW length, steps of a negotiation process are shown in FIG. 3, which include the following steps.

At step 301, a base station indicates a fact of allowing an eDRX mechanism, cell-specific DRX, super-frame information, and the like to the UE through a system information block (SIB).

At step 302, the UE indicates a UE-specific DRX cycle, an expected DRX cycle, and the like to the core network through attachment information or tracking area update (TAU) information.

At step 303, the core network indicates an eDRX configuration to the UE, in which the eDRX configuration includes an eDRX cycle and a PTW length.

At step 304, the core network sends a paging message to the base station based on the eDRX configuration.

At step 305, the base station pages the UE based on the paging message received from the core network.

The negotiation process may be negotiated between the UE and the core network through non-access stratum (NAS) messages, and the base station may perform transparent transmission.

In a non-eDRX mechanism, the UE may monitor a paging message of the radio access network (RAN) at least based on a RAN paging cycle.

In the new radio (NR), an inactive state of the UE is introduced. A UE in the inactive state needs to receive a paging message from the core network (CN), and further needs to receive a paging message of the RAN.

The RAN may configure an inactive state eDRX cycle for a UE in the inactive state, to further reduce the power consumption of the UE in the inactive state.

If the inactive state eDRX cycle is not configured, the UE in the inactive state usually takes the shortest one of the RAN paging cycle, a CN paging cycle, and a default paging cycle as a cycle for monitoring the paging message.

When the inactive state eDRX cycle is configured, the UE in the inactive state monitors the paging message by using a monitoring cycle of the related art, and a case where a monitoring occasion is missed may occur. Therefore, when the inactive state eDRX cycle is configured, it is an urgent problem to be solved how to monitor the paging message by the UE in the inactive state to reduce occurrence of the situation of missing the paging message.

Figure 4:
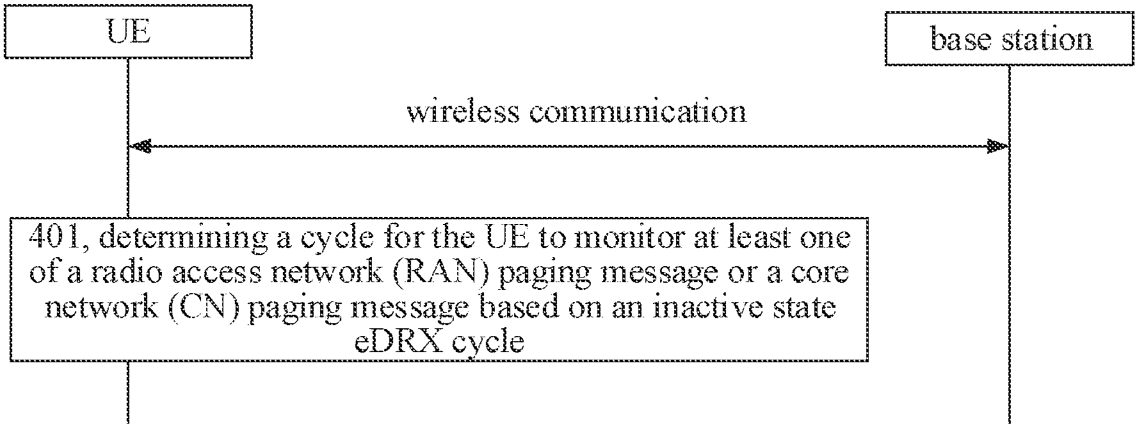
FIG. 4 is a flowchart of a method for determining a paging parameter according to an embodiment.

As shown in FIG. 4, a method for determining a paging parameter is provided in an embodiment, which may be applied to a UE in a cellular mobile communication system. The method includes the following step.

At step 401, a cycle for the UE to monitor at least one of a radio access network (RAN) paging message or a core network (CN) paging message is determined based on an inactive state eDRX cycle.

According to the method for determining a paging parameter provided in the embodiment of the present disclosure, the cycle for the UE to monitor the RAN paging message and/or the CN paging message is determined based on the inactive state eDRX cycle. In this way, the UE may determine, based on the inactive state eDRX cycle, the cycle for the UE to monitor the RAN paging message and/or the CN paging message, which can improve an efficiency of determining the cycle for monitoring the paging message.

In an embodiment, the inactive state eDRX cycle is within a first value range or a second value range, the first value range is different from the second value range.

The inactive state eDRX cycle within the first value range includes an inactive state eDRX cycle with a duration no longer than 10.24 seconds. In a case that the inactive state eDRX cycle is within the first value range, no RAN paging time window (PTW) is configured for the UE.

The inactive state eDRX cycle within the second value range includes an inactive state eDRX cycle with a duration longer than 10.24 seconds. In a case that the inactive state eDRX cycle is within the second value range, a RAN PTW is configured for the UE.

In an embodiment, in a case that the inactive state eDRX cycle is within a first value range, and a CN PTW is configured for the UE, the method further includes: determining, within the CN PTW, the shortest one of the inactive state eDRX cycle, a CN paging cycle, and a default paging cycle as a cycle for monitoring the RAN paging message and the CN paging message.

In an embodiment, in a case that the inactive state eDRX cycle is within a first value range, and a CN PTW is configured for the UE, the method further includes: determining, outside the CN PTW, the inactive state eDRX cycle as a cycle for monitoring the RAN paging message.

In an embodiment, in a case that the inactive state eDRX cycle is within a first value range, and no CN PTW is configured for the UE, the method further includes: determining the shorter one of the inactive state eDRX cycle and an idle state eDRX cycle as a cycle for monitoring the RAN paging message and the CN paging message.

In an embodiment, in a case that the inactive state eDRX cycle is within a first value range, a CN PTW is configured for the UE, and the CN PTW overlaps with a RAN PTW, the method further includes: monitoring, within the CN PTW, the RAN paging message and the CN paging message.

In an embodiment, in a case that the inactive state eDRX cycle is within a second value range, and a CN PTW is configured for the UE, the method further includes: determining, within an overlapped part of a RAN PTW and the CN PTW, the shortest one of a RAN paging cycle, a CN paging cycle, and a default paging cycle as a cycle for monitoring the RAN paging message and the CN paging message.

In an embodiment, in a case that the inactive state eDRX cycle is within a second value range, and a CN PTW is configured for the UE, the method further includes: determining, within a RAN PTW which does not overlap with the CN PTW, a RAN paging cycle as a cycle for monitoring the RAN paging message.

In an embodiment, in a case that the inactive state eDRX cycle is within a second value range, the method further includes: determining, based on the inactive state eDRX cycle, a RAN PTW for monitoring the RAN paging message within the inactive state eDRX cycle.

In an embodiment, the method includes: determining, based on a preset rule, a start position of the RAN PTW; and determining, based on the start position and a duration of the RAN PTW, an end position of the RAN PTW.

In an embodiment, the duration of the RAN PTW is indicated by a base station.

In an embodiment, the method includes: receiving the RAN paging message carrying inactive state eDRX information.

Figure 5:
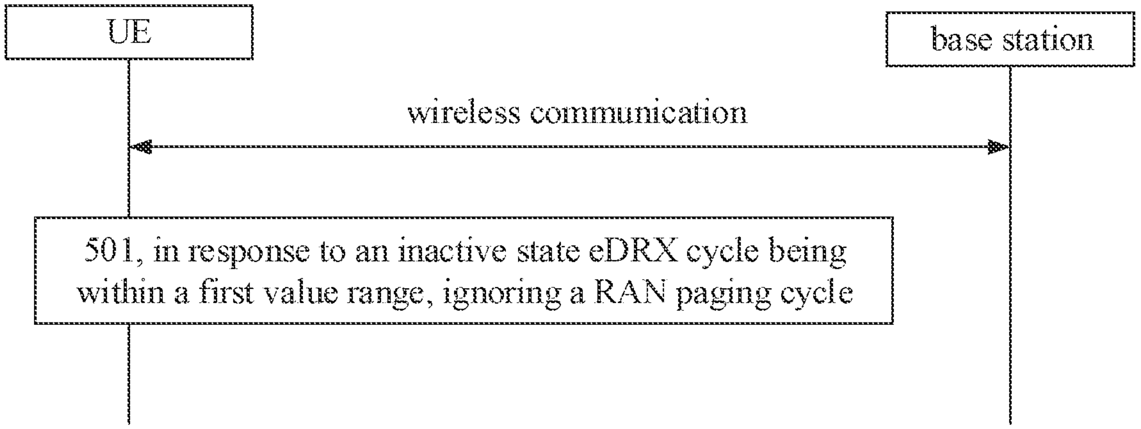
FIG. 5 is a flowchart of a method for determining a paging parameter according to an embodiment.

As shown in FIG. 5, a method for determining a paging parameter is provided in an embodiment, which may be applied to a UE in a cellular mobile communication system. The method includes the following step.

At step 501, in response to an inactive state eDRX cycle being within a first value range, a RAN paging cycle is ignored.

The method in the embodiment may be performed by a UE in the cellular mobile communication, and the UE may include: a terminal such as a mobile phone that performs wireless communication by using a cellular mobile communication technology.

Here, the UE may be a UE in an inactive state. The UE monitors a paging message based on a paging cycle. The paging message may include a CN paging message and a RAN paging message. In the NR, the UE in the inactive state needs to receive a paging message, i.e., the CN paging message, from a core network, and further needs to receive a paging message, i.e., the RAN paging message, from the RAN.

The RAN may configure an inactive state eDRX cycle for the UE in the inactive state to further reduce the power consumption of the UE in the inactive state. The RAN may configure the inactive state eDRX cycle for the UE through an RRC signaling.

A duration of the inactive state eDRX cycle configured by the RAN may be less than a duration of an eDRX cycle configured by the core network.

A value range of the inactive state eDRX cycle may refer to a value range of the duration of the inactive state eDRX cycle.

The value range of the duration of the inactive state eDRX cycle may be {2.56 s, 5.12 s, 10.24 s, and values above 10.24 s}. The values above 10.24 s may include 20.48 s, 40.56 s, and the like.

A paging parameter of the paging message of the UE in the inactive state may include a time domain resource configuration parameter of the paging message and the like. The time domain resource configuration parameter includes, but is not limited to, a time domain position of a time window where the UE monitors the paging message, a cycle for the UE to monitor the paging message, and the like. The time window may include: a CN PTW and/or a RAN PTW. The cycle for the UE to monitor the paging message may include: a cycle for the UE to monitor the paging message within a paging time window, and/or a cycle for the UE to monitor the paging message outside a paging time window, and the like.

For different value ranges of the inactive state eDRX cycle, manners in which the base station sends the paging message are also different. For example, for the inactive state eDRX cycle within the first value range, the base station directly sends the RAN paging message according to the inactive state eDRX cycle. For the inactive state eDRX cycle within a second value range, the base station may set the RAN PTW within the inactive state eDRX cycle, and send the RAN paging message within the RAN PTW according to a certain cycle.

Therefore, the UE may determine a cycle for monitoring the paging message according to the duration of the inactive state eDRX cycle. The UE may monitor paging messages sent by the core network and the RAN respectively based on the determined cycle. For example, the UE may take the shorter one of a cycle for the core network to send the paging message and a cycle for the RAN to send the paging message based on the inactive state eDRX cycle as the cycle for monitoring the paging messages, so that the UE may simultaneously monitor the paging message sent by the core network and the paging message sent by the RAN.

For the inactive state eDRX cycle within the first value range, since the base station directly sends the paging message according to the inactive state eDRX cycle, the RAN paging cycle is no longer used as a cycle for sending the RAN paging message.

The first value range or the second value range may be determined based on the inactive state eDRX cycle set by the base station. If the inactive state eDRX cycle is within the first value range, the base station does not configure the RAN PTW for the UE. If the inactive state eDRX cycle is within the second value range, the base station configures the RAN PTW for the UE.

For an inactive state eDRX cycle with a long duration, the base station may set the RAN PTW within the inactive state eDRX cycle, and send the paging message within the RAN PTW according to a certain cycle. For an inactive state eDRX cycle with a short duration, the base station directly sends the paging message according to the inactive state eDRX cycle.

The first value range or the second value range may be determined based on a duration of a minimum inactive state eDRX cycle required by the base station to set the RAN PTW.

For example, the first value range may be {2.56 s, 5.12 s, 10.24 s}, and the second value range may be the values above 10.24 s, for example, {20.48 s, 40.96 s . . . }.

For example, when the duration of the inactive state eDRX cycle is less than or equal to 10.24 s, the base station directly sends the RAN paging message according to the inactive state eDRX cycle. When the duration of the inactive state eDRX cycle is greater than 10.24 s, the base station may set the RAN PTW within the inactive state eDRX cycle, and send the RAN paging message within the RAN PTW according to a certain cycle.

In this way, the UE may determine, based on the inactive state eDRX cycle, that the UE ignores the RAN paging cycle, which can reduce complexity caused by considering the RAN paging cycle when determining the cycle for monitoring the paging message, and improve an efficiency of determining the cycle for monitoring the paging message.

Figure 6:
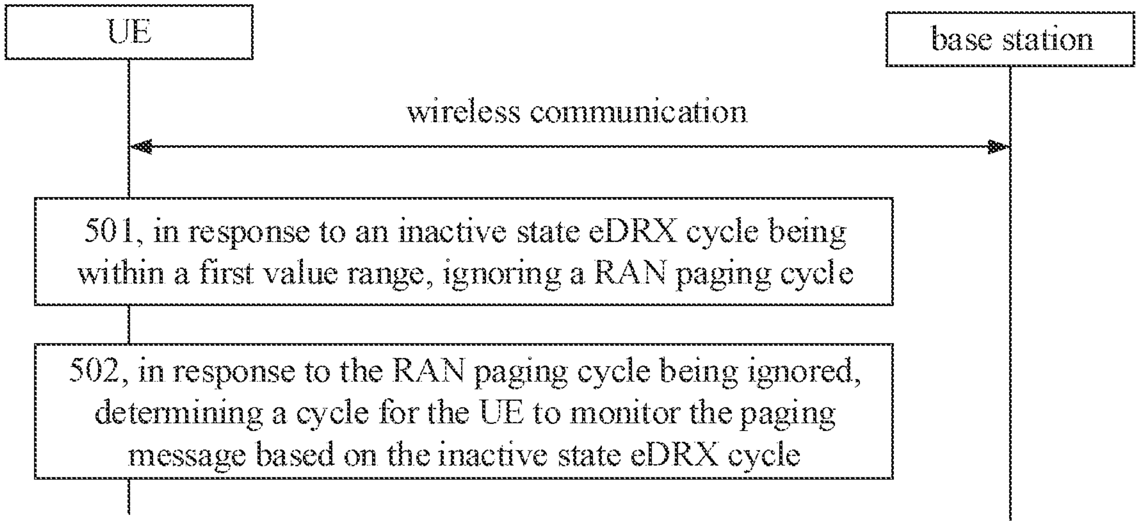
FIG. 6 is a flowchart of a method for determining a paging parameter according to another embodiment.

In an embodiment, as shown in FIG. 6, the method further includes the following step.

At step 502, in response to the RAN paging cycle being ignored, a cycle for the UE to monitor the paging message is determined based on the inactive state eDRX cycle.

If the duration of the inactive state eDRX cycle is within the first value range, the base station directly sends the RAN paging message according to the inactive state eDRX cycle. Then, the UE needs to determine the cycle for monitoring the paging message at least based on the inactive state eDRX cycle.

When the UE only needs to monitor the RAN paging message, the UE may determine a cycle for monitoring the RAN paging message only based on a cycle for the base station to send the RAN paging message, that is, the inactive state eDRX cycle.

When the UE needs to monitor the RAN paging message and the CN paging message at the same time, the UE needs to determine the cycle for monitoring the RAN paging message and the CN paging message based on the inactive state eDRX cycle and a cycle for the core network to send the CN paging message. In this way, the RAN paging message and the CN paging message can be monitored at the same time, therefore occurrence of the situation of missing the paging message is reduced.

In this way, the cycle for the UE to monitor the paging message in the inactive state is determined based on the inactive state eDRX cycle, so that monitoring of the paging message is realized in case of the inactive state eDRX cycle being within the first value range, thereby reducing occurrence of the situation of missing the paging message, and improving the communication efficiency.

In an embodiment, determining, based on the inactive state eDRX cycle, the cycle for the UE to monitor the paging message includes at least one of the following:

- in response to the CN PTW being set for the UE, determining, based on the inactive state eDRX cycle, a CN paging cycle, and a default paging cycle, within the CN PTW, the cycle for monitoring the RAN paging message and the CN paging message; or
- in response to the CN PTW being set for the UE, determining the inactive state eDRX cycle as the cycle for monitoring the RAN paging message outside the CN PTW.

If the CN PTW is set for the UE, the UE needs to monitor the RAN paging message and the CN paging message within the CN PTW at the same time.

The base station sends the RAN paging message based on the inactive state eDRX cycle. Within the CN PTW, the core network sends the CN paging message based on the CN paging cycle and the default paging cycle. The CN paging cycle may include a UE-specific cycle.

Therefore, when the UE simultaneously monitors the RAN paging message and the CN paging message within the CN PTW, the UE needs to determine the cycle for monitoring based on the RAN paging cycle, the CN paging cycle, and the default paging cycle.

In an embodiment, determining, based on the inactive state eDRX cycle, the CN paging cycle, and the default paging cycle, within the CN PTW, the cycle for monitoring the RAN paging message and the CN paging message includes:

within the CN PTW, determining the shortest one of the inactive state eDRX cycle, the CN paging cycle, and the default paging cycle as the cycle for monitoring the RAN paging message and the CN paging message.

Due to a fact that the inactive state eDRX cycle, the CN paging cycle and the default paging cycle may have an integer multiple relationship, the UE may monitor the paging message sent based on any one of the inactive state eDRX cycle, the CN paging cycle, and the default paging cycle by taking the shortest one of the inactive state eDRX cycle, the CN paging cycle, and the default paging cycle as the cycle for monitoring.

Outside the CN PTW, the base station sends the RAN paging message based on the inactive state eDRX cycle. Therefore, the UE may determine the inactive state eDRX cycle as the cycle for monitoring the RAN paging message. In this way, the UE may monitor the RAN paging message outside the CN PTW.

In an embodiment, determining the inactive state eDRX cycle as the cycle for the UE to monitor the RAN paging message includes:

in response to no CN PTW being set for the UE, determining the shorter one of the inactive state eDRX cycle and the CN paging cycle as the cycle for monitoring the RAN paging message and the CN paging message.

If there is no CN PTW set for the UE, the base station sends the RAN paging message based on the inactive state eDRX cycle, and the core network sends the CN paging message based on the CN paging cycle. Therefore, the UE may determine the shorter one of the inactive state eDRX cycle and the CN paging cycle as the cycle for monitoring the RAN paging message and the CN paging message.

Since the inactive state eDRX cycle and the CN paging cycle may have an integer multiple relationship, the shorter one of the inactive state eDRX cycle and the CN paging cycle is taken as the cycle for monitoring, and the UE may monitor the paging message sent based on any one of the inactive state eDRX cycle and the CN paging cycle, which reduces occurrence of the situation of missing the paging message.

In an embodiment, the method further includes:

in response to the inactive state eDRX cycle being within the second value range, determining, based on the inactive state eDRX cycle, the RAN PTW for monitoring the paging message within the inactive state eDRX cycle, in which the first value range is different from the second value range.

In an embodiment, the method further includes:

in response to the inactive state eDRX cycle being within the second value range, determining, at least based on the RAN paging cycle, the cycle for the UE to monitor the paging message, in which the first value range is different from the second value range.

If the duration of the inactive state eDRX cycle is within the second value range, the base station may configure the RAN PTW within the inactive state eDRX cycle. The base station sends the RAN paging message within the RAN PTW according to the RAN paging cycle. Therefore, when the duration of the inactive state eDRX cycle is within the second value range, the UE needs to determine the cycle for monitoring the paging message at least based on the RAN paging cycle.

For example, when the UE in the inactive state needs to monitor the CN paging message and the RAN paging message at the same time, the shorter one of the RAN paging cycle and the cycle for sending the CN paging message may be taken as the cycle for monitoring the CN paging message and the RAN paging message.

The manner of determining the RAN PTW based on the inactive state eDRX cycle may be specified by a communication protocol, or the manner of determining the RAN PTW based on the inactive state eDRX cycle may be agreed upon by the base station and the UE.

One RAN PTW may be set in one inactive state eDRX cycle.

For example, the duration of the RAN PTW may be indicated by the base station, and the RAN PTW is determined by determining a start position of the RAN PTW through a predetermined rule. The predetermined rule may be that the start position of the RAN PTW within the inactive state eDRX cycle is determined by using a predetermined algorithm at least based on the inactive state eDRX cycle, and identity information of the UE (for example, the UE_ID_H). Further, an end position of the RAN PTW is determined.

The base station and the UE may determine the RAN PTW in a same manner, so that the base station may send the RAN message and the UE may monitor the RAN message at a same time domain position.

In the RAN PTW, the base station may send the RAN paging message, meanwhile the core network may send the CN paging message. Therefore, in the RAN PTW, the UE may only need to monitor the RAN paging message, or may need to simultaneously monitor the RAN paging message and the CN paging message.

When the UE only needs to monitor the RAN paging message, the UE may determine the cycle for monitoring the RAN paging message only based on the cycle for the base station to send the RAN paging message, that is, the RAN paging cycle. When the UE needs to simultaneously monitor the RAN paging message and the CN paging message, the UE needs to determine the cycle for monitoring the RAN paging message and the CN paging message based on the RAN paging cycle and the cycle for the core network to send the CN paging message.

In an embodiment, when the inactive state eDRX cycle is within the second value range, determining, at least based on the RAN paging cycle, the cycle for the UE to monitor the paging message includes at least one of the following:

in response to the CN PTW being set for the UE, determining, based on the RAN paging cycle, the CN paging cycle, and the default paging cycle, within the CN PTW which overlaps with the RAN PTW, the cycle for monitoring the RAN paging message and the CN paging message; and in response the CN PTW being set for the UE, determining, within the RAN PTW which does not overlap with the CN PTW, the RAN paging cycle as the cycle for monitoring the RAN paging message.

If the CN PTW is set for the UE, and the CN PTW overlaps with the RAN PTW, the UE needs to simultaneously monitor the RAN paging message and the CN paging message within the CN PTW.

In the RAN PTW, the base station sends the RAN paging message based on the RAN paging cycle. In the CN PTW, the core network sends the CN paging message based on the CN paging cycle and the default paging cycle. The CN paging cycle may include a UE-specific cycle. Therefore, when the UE simultaneously monitors the RAN paging message and the CN paging message, the UE needs to determine the monitoring cycle based on the RAN paging cycle, the CN paging cycle, and the default paging cycle.

In an embodiment, determining, based on the RAN paging cycle, the CN paging cycle, and the default paging cycle, within the CN PTW which overlaps with the RAN PTW, the cycle for monitoring the RAN paging message and the CN paging message includes:

determining, within the CN PTW which overlaps with the RAN PTW, the shortest one of the RAN paging cycle, the CN paging cycle, and the default paging cycle as the cycle for monitoring the RAN paging message and the CN paging message within the CN PTW.

Since the RAN paging cycle, the CN paging cycle and the default paging cycle may have an integer multiple relationship, the UE may monitor the paging message sent based on any one of the RAN paging cycle, the CN paging cycle, and the default paging cycle by taking the shortest one of the RAN paging cycle, the CN paging cycle, and the default paging cycle as the cycle for monitoring.

In the RAN PTW which does not overlap with the CN PTW, the base station sends the RAN paging message based on the RAN paging cycle. Therefore, the UE may determine the RAN paging cycle as the cycle for monitoring the RAN paging message. In this way, the UE may monitor the RAN paging message within the RAN PTW which does not overlap with the CN PTW.

Figure 7:
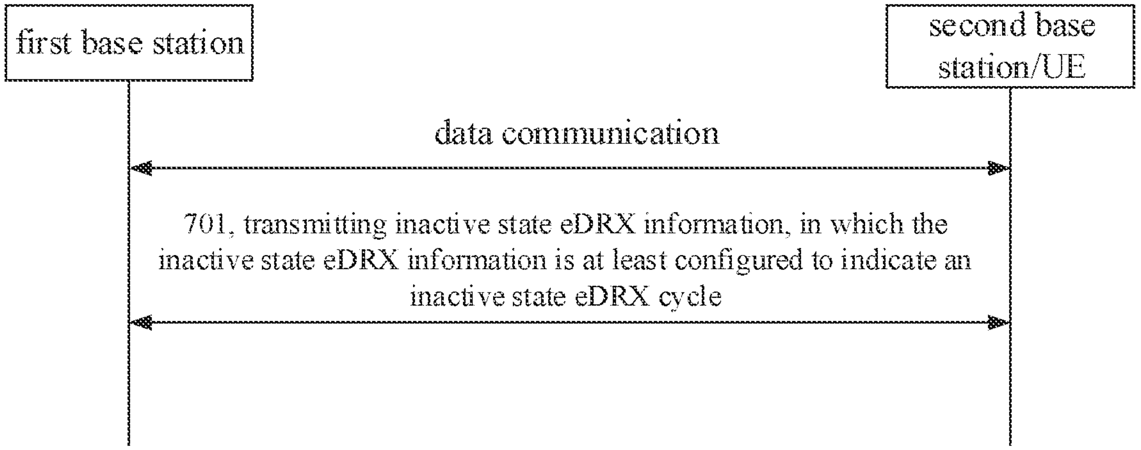
FIG. 7 is a flowchart of a communication method according to an embodiment.

As shown in FIG. 7, a method for transmitting information is provided in an embodiment, which may be applied to a first base station in a cellular mobile communication system. The method includes the following step.

At step 701, inactive state eDRX information is transmitted, in which the inactive state eDRX information is at least configured to indicate an inactive state eDRX cycle.

The inactive state eDRX cycle is configured to determine a cycle for a user equipment (UE) to monitor at least one of a radio access network (RAN) paging message or a core network (CN) paging message.

Here, the first base station may be an anchor base station or a non-anchor base station of a UE in an inactive state. Correspondingly, a second base station is a base station which may perform data transmission with the first base station. For example, the first base station is an anchor base station of the UE, and the second base station is a non-anchor base station of the UE.

The anchor base station may be a base station with which the UE enters the inactive state. The anchor base station may configure or store related information of the UE in the inactive state for the UE, for example, an inactive state eDRX cycle, a RAN paging cycle, and the like.

The inactive state eDRX information may be information associated with the inactive state eDRX cycle. For example, the inactive state eDRX information may indicate configuration information for the UE to monitor a paging message in the inactive state eDRX cycle. The inactive state eDRX information is at least used to indicate the inactive state eDRX cycle. The anchor base station may transmit the inactive state eDRX cycle to the UE through the inactive state eDRX information.

The anchor base station may send configuration information of the UE in the inactive state, such as inactive state eDRX information, to the non-anchor base station.

Transmitting the inactive state eDRX information may include the anchor base station sending the inactive state eDRX information to the non-anchor base station, and/or the non-anchor base station sending the inactive state eDRX information to the anchor base station.

In an embodiment, the non-anchor base station determines the inactive state eDRX cycle configured for the UE based on the received inactive state eDRX information.

In an embodiment, in response to the inactive state eDRX cycle being within a first value range, the non-anchor base station obtains the inactive state eDRX cycle indicated in the received inactive state eDRX information.

In an embodiment, in response to the inactive state eDRX cycle being within a second value range, the non-anchor base station obtains the inactive state eDRX cycle and a RAN paging cycle indicated in the received inactive state eDRX information.

In an embodiment, the first value range is different from the second value range.

The inactive state eDRX cycle within the first value range includes an inactive state eDRX cycle with a duration no longer than 10.24 seconds. In a case that the inactive state eDRX cycle is within the first value range, no RAN paging time window (PTW) is configured for the UE.

The inactive state eDRX cycle within the second value range includes an inactive state eDRX cycle with a duration longer than 10.24 seconds. In a case that the inactive state eDRX cycle is within the second value range, a RAN PTW is configured for the UE.

By transmitting the inactive state eDRX information, the non-anchor base station may at least determine the inactive state eDRX cycle configured for the UE in the inactive state, which reduces the situation of communicating a wrong parameter due to unknown inactive state eDRX cycle used by the same UE in the inactive state.

In an embodiment, transmitting the inactive state eDRX information includes:

transmitting the RAN paging message carrying the inactive state eDRX information to the UE or a second base station.

In an embodiment, transmitting the inactive state eDRX information includes:

transmitting a RAN paging message carrying the inactive state eDRX information to the UE;

performing transmission of a context request message carrying the inactive state eDRX information with the second base station; and performing transmission of a context response message carrying the inactive state eDRX information with the second base station.

The first base station and the second base station may need to perform exchanging of context. In the exchanging of context, the first base station needs to exchange the context request message and the context response message with the second base station.

When the UE is in a coverage range of the first base station, the first base station may send the RAN paging message carrying the inactive state eDRX information to the UE. The UE may determine the inactive state eDRX cycle based on the inactive state eDRX information.

The first base station and the second base station may need to perform the exchanging of context. In the exchanging of context, the first base station needs to exchange the context request message and the context response message with the second base station.

The first base station may carry the inactive state eDRX information in the context request message or the context response message and send the context request message or the context response message to the second base station. In this way, on the one hand, the exchanging of the inactive state eDRX information is realized. On the other hand, the amount of information carried in the context request message or the context response message is increased, therefore efficiency of information exchanging is improved.

In an embodiment, in response to the inactive state eDRX cycle being within a first value range, the inactive state eDRX information is at least used to indicate the inactive state eDRX cycle; and in response to the inactive state eDRX cycle being within a second value range, the inactive state eDRX information is at least used to indicate the inactive state eDRX cycle and the RAN paging cycle, in which the first value range is different from the second value range.

A value range of the inactive state eDRX cycle may be a value range of a duration of the inactive state eDRX cycle.

The value range of the duration of the inactive state eDRX cycle may be {2.56 s, 5.12 s, 10.24 s, and values above 10.24 s}, the values above 10.24 s may include 20.48 s, 40.56 s, and the like.

The first value range or the second value range may be determined based on the inactive state eDRX cycle configured by the base station. If the inactive state eDRX cycle is within the first value range, the base station does not configure the RAN PTW for the UE. If the inactive state eDRX cycle is within the second value range, the base station configures the RAN PTW for the UE.

The first value range or the second value range may be determined based on a duration of a minimum inactive state eDRX cycle required by the base station to set the RAN PTW.

For example, the first value range may be {2.56 s, 5.12 s, 10.24 s}, and the second value range may be the values above 10.24 s, for example, {20.48 s, 40.96 s . . . }.

If the duration of the inactive state eDRX cycle is within the second value range, the base station may configure the RAN PTW within the inactive state eDRX cycle. The base station sends the RAN paging message within the RAN PTW according to the RAN paging cycle. Therefore, when the duration of the inactive state eDRX cycle is within the second value range, the UE needs to determine the cycle for monitoring the paging message at least based on the RAN paging cycle. In addition, the manner of determining the RAN PTW based on the inactive state eDRX cycle may be specified by a communication protocol, or the manner of determining the RAN PTW based on the inactive state eDRX cycle may be agreed upon by the base station and the UE.

Therefore, if the duration of the inactive state eDRX cycle is within the second value range, the non-anchor base station needs to determine a cycle for sending the paging message according to the inactive state eDRX cycle and the RAN paging cycle. The UE needs to determine a cycle for receiving the paging message according to the inactive state eDRX cycle and the RAN paging cycle. Therefore, the anchor base station needs to indicate the inactive state eDRX cycle and the RAN paging cycle to the non-anchor base station and/or the UE.

If the duration of the inactive state eDRX cycle is within the first value range, the base station directly sends the RAN paging message according to the inactive state eDRX cycle. Then, the UE needs to determine the cycle for monitoring the paging message at least based on the inactive state eDRX cycle. The base station or the UE may ignore the RAN paging cycle.

Therefore, if the duration of the inactive state eDRX cycle is within the second value range, the non-anchor base station needs to determine the cycle for sending the paging message according to the inactive state eDRX cycle. The UE needs to determine the cycle for receiving the paging message according to the inactive state eDRX cycle. Therefore, the anchor base station needs to indicate the inactive state eDRX cycle to the non-anchor base station and/or the UE.

For an inactive state eDRX cycle with a long duration, the base station may set the RAN PTW within the inactive state eDRX cycle, and send the paging message within the RAN PTW according to a certain cycle. For an inactive state eDRX cycle with a short duration, the base station directly sends the paging message according to the inactive state eDRX cycle.

A predetermined duration may be determined based on a duration of a minimum inactive state eDRX cycle required by the base station to set the RAN PTW.

Exemplary, when the duration of the inactive state eDRX cycle is greater than 10.24 s, the base station may set the RAN PTW within the inactive state eDRX cycle, and send the RAN paging message within the RAN PTW according to a certain cycle. When the duration of the inactive state eDRX cycle is less than or equal to 10.24 s, the base station directly sends the RAN paging message according to the inactive state eDRX cycle. In this case, the predetermined duration is 10.24 s.

In an embodiment, the inactive state eDRX information is at least used to indicate the inactive state eDRX cycle and the RAN paging cycle.

No matter the duration of the inactive state eDRX cycle is within the first value range or within the second value range, the anchor base station may indicate the inactive state eDRX cycle and the RAN paging cycle to the non-anchor base station and/or the UE. Whether the inactive state eDRX cycle is within the first value range or within the second value range is no longer distinguished, which simplifies complexity of sending the inactive state eDRX information.

In an embodiment, the method further includes:

in response to the first base station being a non-anchor base station, and the inactive state eDRX cycle being within the first value range, decoding the inactive state eDRX cycle indicated by the received inactive state eDRX information, in which the first value range is different from the second value range; and in response to the first base station being a non-anchor base station, and the inactive state eDRX cycle being within the second value range, decoding the inactive state eDRX cycle and the RAN paging cycle indicated by the received inactive state eDRX information.

If the duration of the inactive state eDRX cycle is within the second value range, the base station may configure the RAN PTW within the inactive state eDRX cycle. The base station sends the RAN paging message within the RAN PTW according to the RAN paging cycle. Therefore, when the duration of the inactive state eDRX cycle is within the second value range, the UE needs to determine the cycle for monitoring the paging message at least based on the RAN paging cycle. In addition, the manner of determining the RAN PTW based on the inactive state eDRX cycle may be specified by a communication protocol, or the manner of determining the RAN PTW based on the inactive state eDRX cycle may be agreed upon by the base station and the UE.

Therefore, if the duration of the inactive state eDRX cycle is within the second value range, the non-anchor base station needs to determine a cycle for sending the paging message according to the inactive state eDRX cycle and an RAN paging cycle. The UE needs to determine the cycle for receiving the paging message according to the inactive state eDRX cycle and the RAN paging cycle. The non-anchor base station needs to determine the inactive state eDRX cycle and the RAN paging cycle. Therefore, the non-anchor base station may decode the inactive state eDRX cycle and the RAN paging cycle from the inactive state eDRX information.

If the duration of the inactive state eDRX cycle is within the first value range, the base station directly sends the RAN paging message according to the inactive state eDRX cycle. Then, the UE needs to determine the cycle for monitoring the paging message at least based on the inactive state eDRX cycle. The base station or the UE may ignore the RAN paging cycle.

Therefore, if the duration of the inactive state eDRX cycle is within the second value range, the non-anchor base station needs to determine the cycle for sending the paging message according to the inactive state eDRX cycle. The UE needs to determine the cycle for receiving the paging message according to the inactive state eDRX cycle. The non-anchor base station may send the RAN paging message by only determining the inactive state eDRX cycle. Therefore, the non-anchor base station may only decode the inactive state eDRX cycle from the inactive state eDRX information.

An example is provided below in conjunction with any of the above embodiments.

1. The introduction of a new parameter causes the terminal (i.e., the UE) to change a behavior of receiving the paging message.

The terminal is a terminal in an inactive state.

The new parameter is the inactive state eDRX cycle.

2. If the value range of the inactive state eDRX cycle configured for the terminal is the second value range, the terminal needs to determine a paging parameter according to both the RAN paging cycle and the inactive state eDRX cycle.

The second value range includes values greater than 10.24 s.

In an embodiment: a value range of the RAN paging cycle is {rf32, rf64, rf128, rf256}; and a value range of the inactive state eDRX cycle configured for the terminal is the second value range.

In this case, the terminal monitors the paging message within the RAN PTW according to the RAN paging cycle, in which the RAN PTW is determined based on the inactive state eDRX cycle.

In this case, the terminal simultaneously monitors the CN paging message and the RAN paging message within the CN PTW, in which within the CN PTW, a cycle for monitoring the CN paging message and the RAN paging message needs to be determined through the RAN paging cycle.

In an embodiment, the CN paging message and the RAN paging message may be monitored according to a cycle of min {default paging cycle, UE-specific cycle, RAN paging cycle}.

3. If the value range of the inactive state eDRX cycle configured for the terminal is the first value range, the terminal needs to ignore the configured RAN paging cycle.

In an embodiment, in this case (the value range of the inactive state eDRX cycle is the first value range), the terminal ignores the value of the parameter of the required configured RAN paging cycle.

The first value range is {2.56 s, 5.12 s, 10.24 s}.

In an embodiment:

1) if the CN PTW is configured:

outside the PTW window, the paging message is monitored according to the inactive state eDRX cycle. The CN paging message and the RAN paging message are simultaneously monitored within the CN PTW. Within the CN PTW, the cycle for monitoring the CN paging message and the RAN paging message needs to be determined according to the inactive state eDRX cycle.

In an embodiment, the CN paging message and the RAN paging message are monitored according to a cycle of min{default paging cycle, UE-specific cycle, inactive state eDRX cycle}.

2) if no CN PTW is configured:

the CN paging message and the RAN paging message are monitored according to the shorter one of the CN eDRX cycle and the inactive state eDRX cycle.

4. When eDRX related parameter is transmitted between nodes, the following may be followed.

a) In an embodiment, the eDRX related parameter is used for message transmission between the anchor base station and the non-anchor base station message of the UE in the inactive state.

b) In an embodiment, a transmitted message may be the RAN paging message.

c) In an embodiment, the transmitted message may be a UE context request message/a UE context response message.

d) In an embodiment, an attribute of the RAN paging cycle is optional.

If the value range of the inactive state eDRX cycle is the first value range, it is necessary for the anchor base station to simultaneously transmit the RAN paging cycle and the inactive state DRX cycle.

If the value range of the inactive state eDRX cycle is the second value range, the anchor base station only needs to transmit the inactive state eDRX cycle. At this case, the RAN paging cycle does not need to be transmitted between the base stations.

e) In an embodiment, the attribute of the RAN paging cycle becomes required;

If the value range of the inactive state eDRX cycle is the second value range, it is necessary for the non-anchor base station to decode and obtain both the RAN paging cycle and the inactive state eDRX cycle.

If the value range of the inactive state eDRX cycle is the first value range, the non-anchor base station may only decode and obtain the inactive state eDRX cycle, and ignore the RAN paging cycle.

Figure 8:
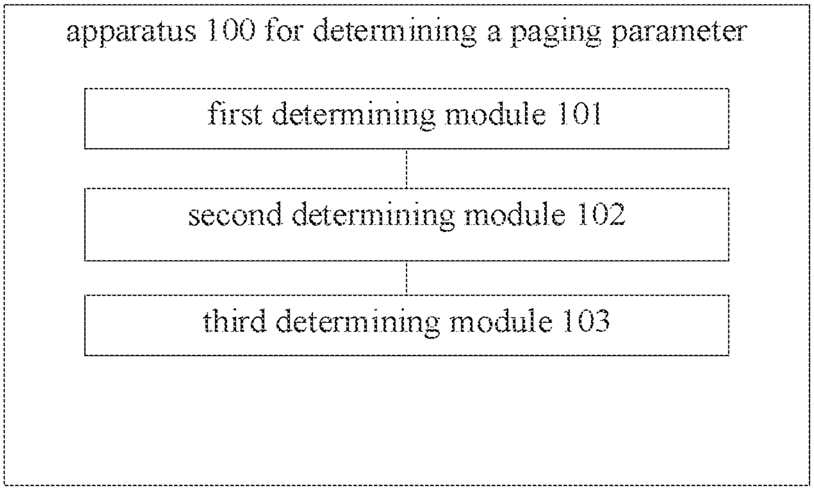
FIG. 8 is a block diagram of an apparatus for determining a paging parameter according to an embodiment.

An embodiment of the present disclosure further provides an apparatus for determining a paging parameter, which is applied to a UE in a cellular mobile wireless communication. As shown in FIG. 8, the apparatus 100 for determining a paging parameter includes a first determining module 101.

The first determining module 101 is configured to determine a cycle for the UE to monitor at least one of a radio access network (RAN) paging message or a core network (CN) paging message based on an inactive state eDRX cycle.

In an embodiment, the inactive state eDRX cycle is within a first value range or a second value range, the first value range is different from the second value range.

The inactive state eDRX cycle within the first value range includes an inactive state eDRX cycle with a duration no longer than 10.24 seconds. In a case that the inactive state eDRX cycle is within the first value range, no RAN paging time window (PTW) is configured for the UE.

The inactive state eDRX cycle within the second value range includes an inactive state eDRX cycle with a duration than 10.24 seconds. In a case that the inactive state eDRX cycle is within the second value range, a RAN PTW is configured for the UE.

In an embodiment, the apparatus 100 further includes a second determining module 102.

The second determining module 102 is configured to, in a case that the inactive state eDRX cycle is within a first value range, and that a CN PTW is configured for the UE, determine, within the CN PTW, the shortest one of the inactive state eDRX cycle, a CN paging cycle, and a default paging cycle as a cycle for monitoring the RAN paging message and the CN paging message.

The second determining module 102 is configured to, in a case that the inactive state eDRX cycle is within a first value range, and that a CN PTW is configured for the UE, determine, outside the CN PTW, the inactive state eDRX cycle as a cycle for monitoring the RAN paging message.

The second determining module 102 is configured to, in a case that the inactive state eDRX cycle is within a first value range, and that no CN PTW is configured for the UE, determine the shorter one of the inactive state eDRX cycle and an idle state eDRX cycle as a cycle for monitoring the RAN paging message and the CN paging message.

The second determining module 102 is configured to, in a case that the inactive state eDRX cycle is within a first value range, that a CN PTW is configured for the UE, and that the CN PTW overlaps with a RAN PTW, monitor, within the CN PTW, the RAN paging message and the CN paging message.

The second determining module 102 is configured to, in a case that the inactive state eDRX cycle is within a second value range, and that a CN PTW is configured for the UE, determine, within an overlapped part of a RAN PTW and the CN PTW, the shortest one of a RAN paging cycle, a CN paging cycle, and a default paging cycle as a cycle for monitoring the RAN paging message and the CN paging message.

The second determining module 102 is configured to, in a case that the inactive state eDRX cycle is within a second value range, and that a CN PTW is configured for the UE, determine, within a RAN PTW which does not overlap with the CN PTW, a RAN paging cycle as a cycle for monitoring the RAN paging message.

The second determining module 102 is configured to, in a case that the inactive state eDRX cycle is within a second value range, determine, based on the inactive state eDRX cycle, a RAN PTW for monitoring the RAN paging message within the inactive state eDRX cycle.

In an embodiment, the apparatus 100 further includes a third determining module 130.

The third determining module 103 is configured to determine, based on a preset rule, a start position of the RAN PTW; and determine, based on the start position and a duration of the RAN PTW, an end position of the RAN PTW.

In an embodiment, the duration of the RAN PTW is indicated by a base station.

In an embodiment, the method includes: receiving the RAN paging message carrying inactive state eDRX information.

Figure 9:
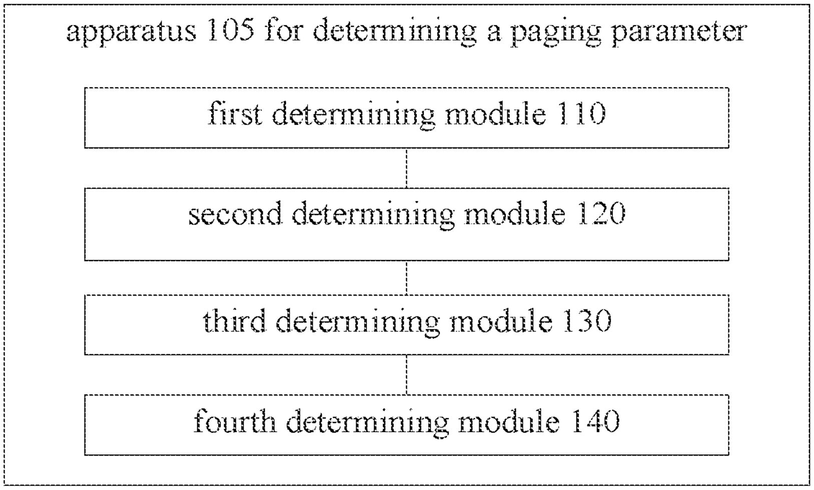
FIG. 9 is a block diagram of an apparatus for determining a paging parameter according to an embodiment.

An embodiment of the present disclosure further provides an apparatus for determining a paging parameter, which is applied to a UE in a cellular mobile wireless communication. As shown in FIG. 9, the apparatus 105 for determining a paging parameter includes a first determining module 110.

The first determining module 110 is configured to ignore a RAN paging cycle in response to an inactive state eDRX cycle being within a first value range.

In an embodiment, the apparatus 105 further includes a second determining module 120.

The second determining module 120 is configured to determine, based on the inactive state eDRX cycle, a cycle for the UE to monitor a paging message, in response to the RAN paging cycle being ignored.

In an embodiment, the second determining module 120 is configured to perform at least one of the following:

in response to a core network (CN) paging time window (PTW) being set for the UE, determining, based on the inactive state eDRX cycle, a CN paging cycle, and a default paging cycle, within the CN PTW, a cycle for monitoring a RAN paging message and a CN paging message; or in response to a CN PTW being set for the UE, determining the inactive state eDRX cycle as a cycle for monitoring a RAN paging message outside the CN PTW.

In an embodiment, the second determining module 120 is configured to:

determine, within the CN PTW, the shortest one of the inactive state eDRX cycle, the CN paging cycle, and the default paging cycle as the cycle for monitoring the RAN paging message and the CN paging message.

In an embodiment, the second determining module 120 is configured to:

in response to no CN PTW being set for the UE, determine the shorter one of the inactive state eDRX cycle and a CN paging cycle as the cycle for monitoring a RAN paging message and a CN paging message.

In an embodiment, the apparatus 105 further includes a third determining module 130.

The third determining module 130 is configured to determine, based on the inactive state eDRX cycle, a RAN PTW for monitoring a paging message within the inactive state eDRX cycle, in response to the inactive state eDRX cycle being within a second value range, in which the first value range is different from the second value range.

In an embodiment, the apparatus 105 further includes a fourth determining module 140.

The fourth determining module 140 is configured to determine, at least based on the RAN paging cycle, a cycle for the UE to monitor a paging message, in response to the inactive state eDRX cycle being within a second value range, in which the first value range is different from the second value range.

In an embodiment, the fourth determining module 140 is configured to perform at least one of the following:

in response to a CN PTW being set for the UE, determining, based on the RAN paging cycle, a CN paging cycle, and a default paging cycle, within the CN PTW which overlaps with a RAN PTW, a cycle for monitoring a RAN paging message and a CN paging message; or in response to a CN PTW being set for the UE, determining, within a RAN PTW which does not overlap with the CN PTW, the RAN paging cycle as a cycle for monitoring a RAN paging message.

In an embodiment, the fourth determining module 140 is configured to:

determine, within the CN PTW which overlaps with the RAN PTW, the shortest one of the RAN paging cycle, the CN paging cycle, and the default paging cycle as the cycle for monitoring the RAN paging message and the CN paging message within the CN PTW.

Figure 10:
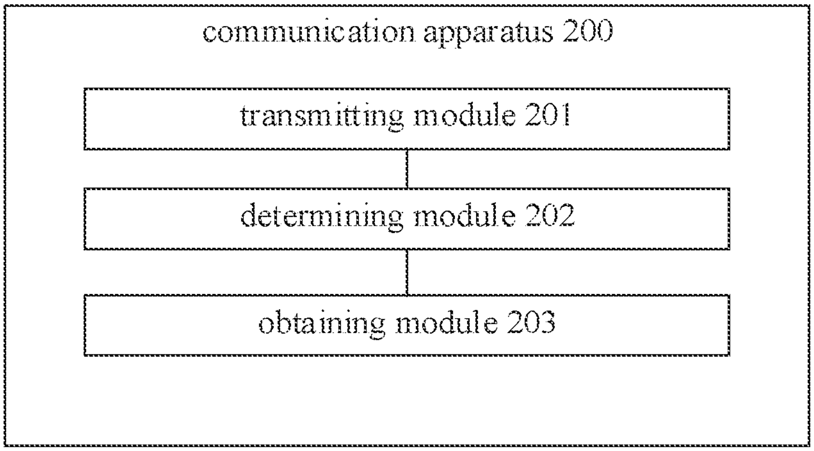
FIG. 10 is a block diagram of a communication apparatus according to an embodiment.

An embodiment of the present disclosure further provides a communication apparatus, which is applied to a first base station in a cellular mobile wireless communication. As shown in FIG. 10, the communication apparatus 200 includes a transmitting module 201.

The transmitting module 201 is configured to transmit inactive state extended discontinuous reception (eDRX) information, in which the inactive state eDRX information is at least configured to indicate an inactive state eDRX cycle, and the inactive state eDRX cycle is configured to determine a cycle for a user equipment (UE) to monitor at least one of a radio access network (RAN) paging message or a core network (CN) paging message.

In an embodiment, the transmitting module 201 is configured to: transmit the RAN paging message carrying the inactive state eDRX information to the UE or a second base station.

In an embodiment, the first base station is an anchor base station, the transmitting module 201 is configured to transmit the inactive state eDRX information to a non-anchor base station.

In an embodiment, the first base station is a non-anchor base station, the transmitting module 201 is configured to transmit the inactive state eDRX information to an anchor base station.

In an embodiment, the first base station is an anchor base station, the transmitting module 201 is configured to transmit configuration information of the UE to a second base station, in which the configuration information includes the inactive state eDRX information.

In an embodiment, the first base station is a non-anchor base station, the communication apparatus 200 further includes a determining module 202, configured to determine, based on the inactive state eDRX information, the inactive state eDRX cycle configured for the UE.

In an embodiment, the first base station is a non-anchor base station, the communication apparatus 200 further includes an obtaining module 203, configured to obtain the inactive state eDRX cycle indicated in the inactive state eDRX information, in which the inactive state eDRX cycle is within a first value range.

In an embodiment, the first base station is a non-anchor base station, the communication apparatus 200 further includes an obtaining module 203, configured to obtain the inactive state eDRX cycle and a RAN paging cycle indicated in the inactive state eDRX information, in which the inactive state eDRX cycle is within a second value range.

In an embodiment, the inactive state eDRX cycle is within a first value range or a second value range, the first value range is different from the second value range.

The inactive state eDRX cycle within the first value range includes an inactive state eDRX cycle with a duration no longer than 10.24 seconds. In a case that the inactive state eDRX cycle is within the first value range, no RAN paging time window (PTW) is configured for the UE.

The inactive state eDRX cycle within the second value range includes an inactive state eDRX cycle with a duration longer than 10.24 seconds. In a case that the inactive state eDRX cycle is within the second value range, a RAN PTW is configured for the UE.

In an embodiment, the inactive state eDRX cycle is within a first value range, and a CN PTW is configured for the UE, within the CN PTW, the shortest one of the inactive state eDRX cycle, a CN paging cycle, and a default paging cycle is configured to be determined as the cycle for monitoring the RAN paging message and the CN paging message.

In an embodiment, the inactive state eDRX cycle is within a first value range, and a CN PTW is configured for the UE, outside the CN PTW, the inactive state eDRX cycle is configured to be determined as a cycle for monitoring the RAN paging message.

In an embodiment, the inactive state eDRX cycle is within a first value range, and no CN PTW is configured for the UE, the shorter one of the inactive state eDRX cycle and an idle state eDRX cycle is configured to be determined as a cycle for monitoring the RAN paging message and the CN paging message.

In an embodiment, the inactive state eDRX cycle is within a first value range, a CN PTW is configured for the UE, and the CN PTW overlaps with a RAN PTW, within the CN PTW, the inactive state eDRX cycle is configured for the UE to monitor the RAN paging message and the CN paging message.

In an embodiment, the inactive state eDRX cycle is within a second value range, and a CN PTW is configured for the UE, within an overlapped part of a RAN PTW and the CN PTW, the shortest one of a RAN paging cycle, a CN paging cycle, and a default paging cycle is configured to be determined as a cycle for the UE to monitor the RAN paging message and the CN paging message.

In an embodiment, the inactive state eDRX cycle is within a second value range, and a CN PTW is configured for the UE, within a RAN PTW which does not overlap with the CN PTW, a RAN paging cycle is configured to be determined as a cycle for monitoring the RAN paging message.

In an embodiment, the inactive state eDRX cycle is within a second value range, the inactive state eDRX cycle is configured to be determined as a RAN PTW for monitoring the RAN paging message within the inactive state eDRX cycle.

In an embodiment, a start position of the RAN PTW is determined based on a preset rule; and an end position of the RAN PTW is determined based on the start position and a duration of the RAN PTW.

In an embodiment, the duration of the RAN PTW is indicated by the first base station.

Figure 11:
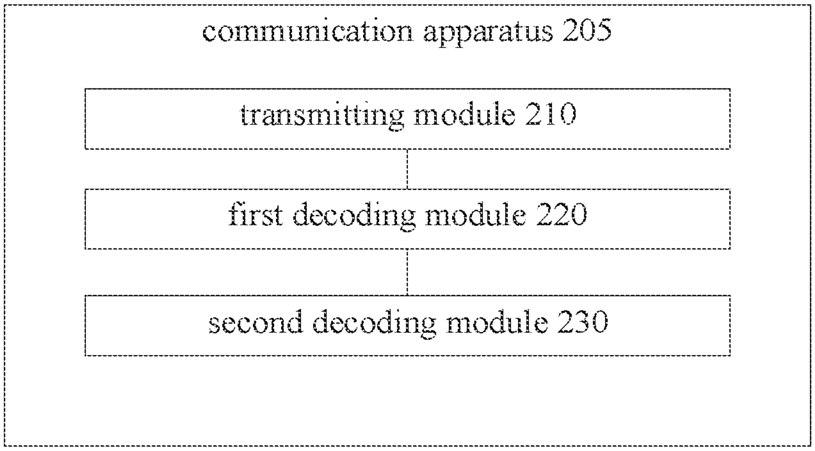
FIG. 11 is a block diagram of a communication apparatus according to an embodiment.

An embodiment of the present disclosure further provides a communication apparatus for transmitting information, which is applied to a first base station in a cellular mobile wireless communication. As shown in FIG. 11, the communication apparatus 205 includes a transmitting module 210.

The transmitting module 210 is configured to transmit inactive state extended discontinuous reception (eDRX) information, in which the inactive state eDRX information is at least configured to indicate an inactive state eDRX cycle.

In an embodiment, the transmitting module 210 is configured to:

transmit a RAN paging message carrying the inactive state eDRX information to the UE;

perform transmission of a context request message carrying the inactive state eDRX information with the second base station; and perform transmission of a context response message carrying the inactive state eDRX information with the second base station.

In an embodiment, in response to the inactive state eDRX cycle being within a first value range, the inactive state eDRX information is at least configured to indicate the inactive state eDRX cycle; and in response to the inactive state eDRX cycle being within a second value range, the inactive state eDRX information is at least configured to indicate the inactive state eDRX cycle and a RAN paging cycle, in which the first value range is different from the second value range.

In an embodiment, the inactive state eDRX information is at least configured to indicate the inactive state eDRX cycle and a RAN paging cycle.

In an embodiment, the apparatus 205 further includes a first decoding module 220 and a second decoding module 230.

The first decoding module 220 is configured to decode the inactive state eDRX cycle indicated by the inactive state eDRX information, in response to the first base station being a non-anchor base station, and the inactive state eDRX cycle being within a first value range, wherein the first value range is different from the second value range.

The second decoding module 230 is configured to decode the inactive state eDRX cycle and the RAN paging cycle indicated by the inactive state eDRX information, in response to the first base station being a non-anchor base station, and the inactive state eDRX cycle being within the second value range.

In an embodiment, the first determining module 110, the second determining module 120, the third determining module 130, the fourth determining module 140, the transmitting module 210, the first decoding module 220, and the second decoding module 230 may be implemented by one or more CPUs (central processing units), GPUs (graphics processing units), BPs (baseband processors), ASICs (application specific integrated circuits), DSPs, PLDs (programmable logic devices), CPLDs (complex programmable logic devices), FPGAs (field-programmable gate arrays), general-purpose processors, controllers, MCUs (micro controller units), microprocessors, or other electronic components, for performing the aforementioned method.

Figure 12:
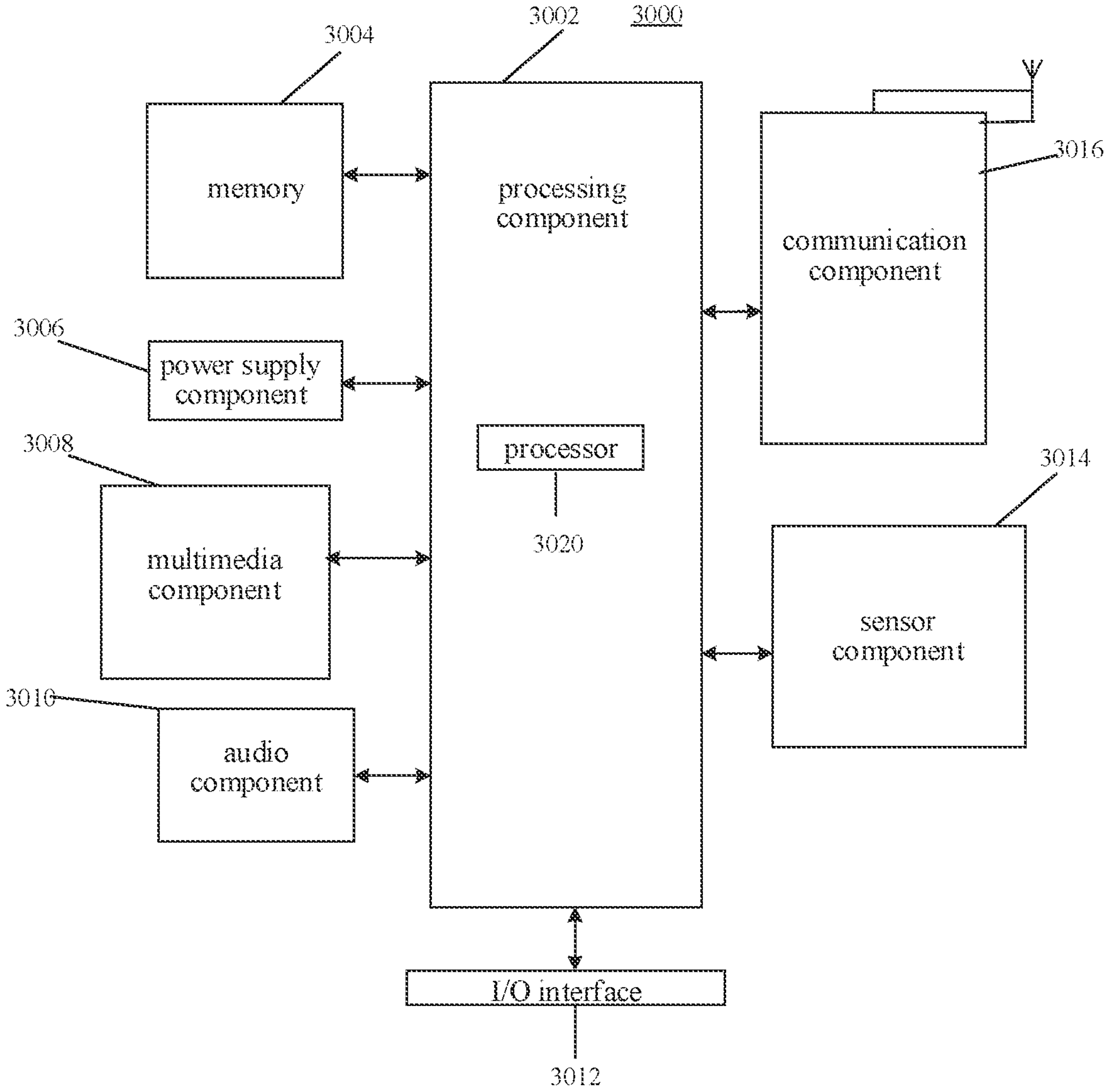
FIG. 12 is a block diagram of an apparatus for determining a paging parameter or a communication apparatus according to an embodiment.

FIG. 12 is a block diagram of an apparatus 3000, which may be an apparatus for determining a paging parameter or a communication apparatus, according to an embodiment. For example, the apparatus 3000 may be a base station, or a UE such as a mobile phone, a computer, a digital broadcasting terminal, a messaging device, a game console, a tablet device, a medical equipment, a fitness equipment, a personal digital assistant, etc.

Referring to FIG. 12, the apparatus 3000 may include one or more components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the whole operation of the apparatus 3000, such as the operations related to display, phone call, data communication, camera operation and recording operation. The processing component 3002 may include one or more processors 3020 to perform instructions, to complete all or part of steps of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store all types of data to support the operation of the apparatus 3000. Examples of the data include the instructions of any applications or methods operated on the apparatus 3000, contact data, phone book data, messages, pictures, videos, etc. The memory 3004 may be implemented by any type of volatile or non-volatile storage devices or their combination, such as a stationary random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 may provide power supply for all components of the apparatus 3000. The power supply component 3006 may include power supply management system, one or more power supplies, and other units related to generating, managing and distributing power for the apparatus 3000.

The multimedia component 3008 includes an output interface screen provided between the apparatus 3000 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 3008 includes a front camera and/or a rear camera. When the apparatus 3000 is in operation mode, such as shooting mode or video mode, the front camera or the rear camera may receive the external multimedia data. Each front camera and rear camera may be a fixed optical lens system or an optical lens system with focal length and optical zoom capacity.

The audio component 3010 is configured as an output and/or input signal. For example, the audio component 3010 includes a microphone (MIC). When the apparatus 3000 is in operation mode, such as call mode, record mode, and speech recognition mode, the microphone is configured to receive the external audio signals. The audio signals received may be further stored in the memory 3004 or sent via the communication component 3016. In some embodiments, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The buttons may include but not limited to a home button, a volume button, a start button and a lock button.

The sensor component 3014 includes one or more sensors, configured to provide various aspects of status assessment for the apparatus 3000. For example, the sensor component 3014 may detect the on/off state of the apparatus 3000 and the relative positioning of the component. For example, the component is a display and a keypad of the apparatus 3000. The sensor component 3014 may further detect the location change of the apparatus 3000 or one component of the apparatus 3000, the presence or absence of contact between the user and the apparatus 3000, the orientation or acceleration/deceleration of the apparatus 3000, and the temperature change of the apparatus 3000. The sensor component 3014 may include a proximity sensor, which is configured to detect the existence of the objects nearby without any physical contact. The sensor component 3014 may further include a light sensor such as CMOS or CCD image sensor, which is configured to use in imaging applications. In some embodiments, the sensor component 3014 may further include an acceleration transducer, a gyroscope sensor, a magnetic sensor, a pressure sensor or a temperature sensor.

The communication component 3016 is configured for the convenience of wire or wireless communication between the apparatus 3000 and other devices. The apparatus 3000 may access wireless networks based on communication standard, such as WiFi, 2G, 3G, 4G or 5G, 6G, or their combination. In an embodiment, the communication component 3016 receives broadcast signals or broadcast-related information from an external broadcast management system via a broadcast channel. In an exemplary embodiment, the communication component 3016 further includes a near field communication (NFC) module to facilitate short-range communication. For example, an NFC module may be implemented based on radio frequency identification (RFID) technology, infrared data association (IRDA) technology, ultra-wideband (UWB) technology, Bluetooth (BT) technology and other technologies.

In an exemplary embodiment, the apparatus 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, to perform the above method.

In an embodiment, a non-temporary computer readable storage medium is further provided which includes instructions, such as the memory 3004 including instructions. The instructions may be executed by the processor 3020 of the apparatus 3000 to complete the above methods. For example, the non-transitory computer readable storage medium may be a ROM, a random access memory (RAM), a CD-ROM, a magnetic tape, a floppy disk, an optical data storage device, etc.

Other embodiments of the present disclosure will be apparent to those skilled in the art from consideration of the specification and practice of the disclosure disclosed here. This application is intended to cover any variations, uses, or adaptations of the present disclosure following the general principles thereof and including such departures from the present disclosure as come within known or customary practice in the art.

It should be understood that the present disclosure is not limited to the precise structure described above and shown in the drawings, and various modifications and changes may be made without departing from its scope. The scope of the present disclosure is only limited by the appended claims.

What is claimed is:

1. A method for determining a paging parameter, performed by a user equipment (UE), comprising:

in case that the UE's extended discontinuous reception (DRX) cycle in RRC_INACTIVE is within a first value range, determining, within a core network (CN) paging time window (PTW), a shortest one of the extended DRX cycle in RRC_INACTIVE, a CN paging cycle, and a default paging cycle as a cycle for monitoring a radio access network (RAN) paging message and a CN paging message, wherein the CN PTW is configured for the UE; and in case that the extended DRX cycle in RRC_INACTIVE is within a second value range, determining, within an overlapped part of a RAN PTW and the CN PTW, a shortest one of a RAN paging cycle, a CN paging cycle, and a default paging cycle as a cycle for monitoring the RAN paging message and the CN paging message, wherein the CN PTW is configured for the UE;

wherein the second value range is different from the first value range.

2. The method of claim 1, further comprising:

ignoring the RAN paging cycle in case that the extended DRX cycle in RRC_INACTIVE is within the first value range.

3. The method of claim 1, further comprising:

in case that the extended DRX cycle in RRC_INACTIVE is within the first value range, determining, outside the CN PTW, the extended DRX cycle in RRC_INACTIVE as a cycle for monitoring the RAN paging message, wherein the CN PTW is configured for the UE.

4. The method of claim 1, further comprising:

in case that the extended DRX cycle in RRC_INACTIVE is within the first value range, determining a shorter one of the extended DRX cycle in RRC_INACTIVE and a CN paging cycle as a cycle for monitoring the RAN paging message and the CN paging message, wherein no CN PTW is configured for the UE.

5. The method of claim 1, further comprising:

monitoring, within the CN PTW, the RAN paging message and the CN paging message, wherein the CN PTW is configured for the UE, and the CN PTW overlaps with a RAN PTW.

6. The method of claim 1, further comprising:

in case that the extended DRX cycle in RRC_INACTIVE is within the second value range, determining, within a RAN PTW which does not overlap with the CN PTW, a RAN paging cycle as a cycle for monitoring the RAN paging message, wherein the CN PTW is configured for the UE.

7. The method of claim 1, further comprising:

in case that the extended DRX cycle in RRC_INACTIVE is within the second value range, determining, based on the extended DRX cycle in RRC_INACTIVE, a RAN PTW for monitoring the RAN paging message within the extended DRX cycle in RRC_INACTIVE.

8. The method of claim 7, further comprising:

determining, based on a preset rule, a start position of the RAN PTW within the extended DRX cycle in RRC_INACTIVE; and determining, based on the start position and a duration of the RAN PTW, an end position of the RAN PTW.

9. The method of claim 8, wherein the duration of the RAN PTW is indicated by a base station.

10. The method of claim 1, further comprising:

receiving the RAN paging message carrying extended DRX information in RRC_INACTIVE.

11. A communication method, performed by a first base station, comprising:

transmitting extended discontinuous reception (DRX) information in RRC_INACTIVE;

wherein, in case that an extended DRX cycle in RRC_INACTIVE is within a first value range, the extended DRX information in RRC_INACTIVE is at least configured to indicate the extended DRX cycle in RRC_INACTIVE, and within a core network (CN) paging time window (PTW), a shortest one of the extended DRX cycle in RRC_INACTIVE, a CN paging cycle, and a default paging cycle is used to determine a cycle for a user equipment (UE) to monitor a RAN paging message and a CN paging message, wherein the CN PTW is configured for the UE; and wherein, in case that the extended DRX cycle in RRC_INACTIVE is within a second value range, the extended DRX information in RRC_INACTIVE is at least configured to indicate the extended DRX cycle in RRC_INACTIVE and a RAN paging cycle, and within an overlapped part of a RAN PTW and a CN PTW, a shortest one of the RAN paging cycle, a CN paging cycle, and a default paging cycle is used to determine a cycle for the UE to monitor the RAN paging message and the CN paging message, wherein the CN PTW is configured for the UE;

wherein the second value range is different from the first value range.

12. The method of claim 11, wherein transmitting the extended DRX information in RRC_INACTIVE comprises:

transmitting the RAN paging message carrying the extended DRX information in RRC_INACTIVE to the UE or a second base station.

13. The method of claim 11, wherein transmitting the extended DRX information in RRC_INACTIVE comprises at least one of:

transmitting, by an anchor base station, the extended DRX information in RRC_INACTIVE to a non-anchor base station; or transmitting, by a non-anchor base station, the extended DRX information in RRC_INACTIVE to an anchor base station;

wherein the method further comprises at least one of:

transmitting, by the first base station to a second base station, configuration information of the UE, wherein the first base station is the anchor base station, and the configuration information comprises the extended DRX information in RRC_INACTIVE;

determining, based on the extended DRX information in RRC_INACTIVE, the extended DRX cycle in RRC_INACTIVE configured for the UE, wherein the first base station is the non-anchor base station;

obtaining the extended DRX cycle in RRC_INACTIVE indicated in the extended DRX information in RRC_INACTIVE, wherein the first base station is the non-anchor base station, and the extended DRX cycle in RRC_INACTIVE is within the first value range; or obtaining the extended DRX cycle in RRC_INACTIVE and a RAN paging cycle indicated in the extended DRX information in RRC_INACTIVE, wherein the first base station is the non-anchor base station, and the extended DRX cycle in RRC_INACTIVE is within the second value range.

14. The method of claim 11, wherein:

the extended DRX cycle in RRC_INACTIVE is within the first value range;

a CN PTW is configured for the UE; and outside the CN PTW, the extended DRX cycle in RRC_INACTIVE is configured to be determined as a cycle for monitoring the RAN paging message.

15. The method of claim 11, wherein:

the extended DRX cycle in RRC_INACTIVE is within the first value range;

no CN PTW is configured for the UE; and a shorter one of the extended DRX cycle in RRC_INACTIVE and a CN paging cycle is configured to be determined as a cycle for monitoring the RAN paging message and the CN paging message.

16. The method of claim 11, further comprising:

transmitting the RAN paging message and the CN paging message within the CN PTW, wherein the CN PTW is configured for the UE, and the CN PTW overlaps with a RAN PTW.

17. The method of claim 11, wherein:

the extended DRX cycle in RRC_INACTIVE is within the second value range;

a CN PTW is configured for the UE; and within a RAN PTW which does not overlap with the CN PTW, a RAN paging cycle is configured to be determined as a cycle for monitoring the RAN paging message.

18. The method of claim 11, wherein:

the extended DRX cycle in RRC_INACTIVE is within the second value range; and the extended DRX cycle in RRC_INACTIVE is configured to be determined as a RAN PTW for monitoring the RAN paging message within the extended DRX cycle in RRC_INACTIVE.

19. The method of claim 18, wherein:

a start position of the RAN PTW within the extended DRX cycle in RRC_INACTIVE is determined based on a preset rule; and an end position of the RAN PTW is determined based on the start position and a duration of the RAN PTW.

20. The method of claim 19, wherein the duration of the RAN PTW is indicated by the first base station.

21. A first base station, comprising:

a processor, and a memory having executable instructions stored thereon;

wherein the processor is configured to perform the method according to claim 11.

22. A user equipment (UE), comprising:

a processor; and a memory having executable instructions stored thereon;

wherein the processor is configured to:

in case that the UE's extended discontinuous reception (DRX) cycle in RRC_INACTIVE is within a first value range, determine, within a core network (CN) paging time window (PTW), a shortest one of the extended DRX cycle in RRC_INACTIVE, a CN paging cycle, and a default paging cycle as a cycle for monitoring a radio access network (RAN) paging message and a CN paging message, wherein the CN PTW is configured for the UE; and in case that the extended DRX cycle in RRC_INACTIVE is within a second value range, determine, within an overlapped part of a RAN PTW and the CN PTW, a shortest one of a RAN paging cycle, a CN paging cycle, and a default paging cycle as a cycle for monitoring the RAN paging message and the CN paging message, wherein the CN PTW is configured for the UE;

wherein the second value range is different from the first value range.

* * * * *